June 6, 1961  L. W. G. BEYDLER  2,986,855
PRECISION OPTICAL TOOLING
Filed Aug. 12, 1958  2 Sheets-Sheet 1
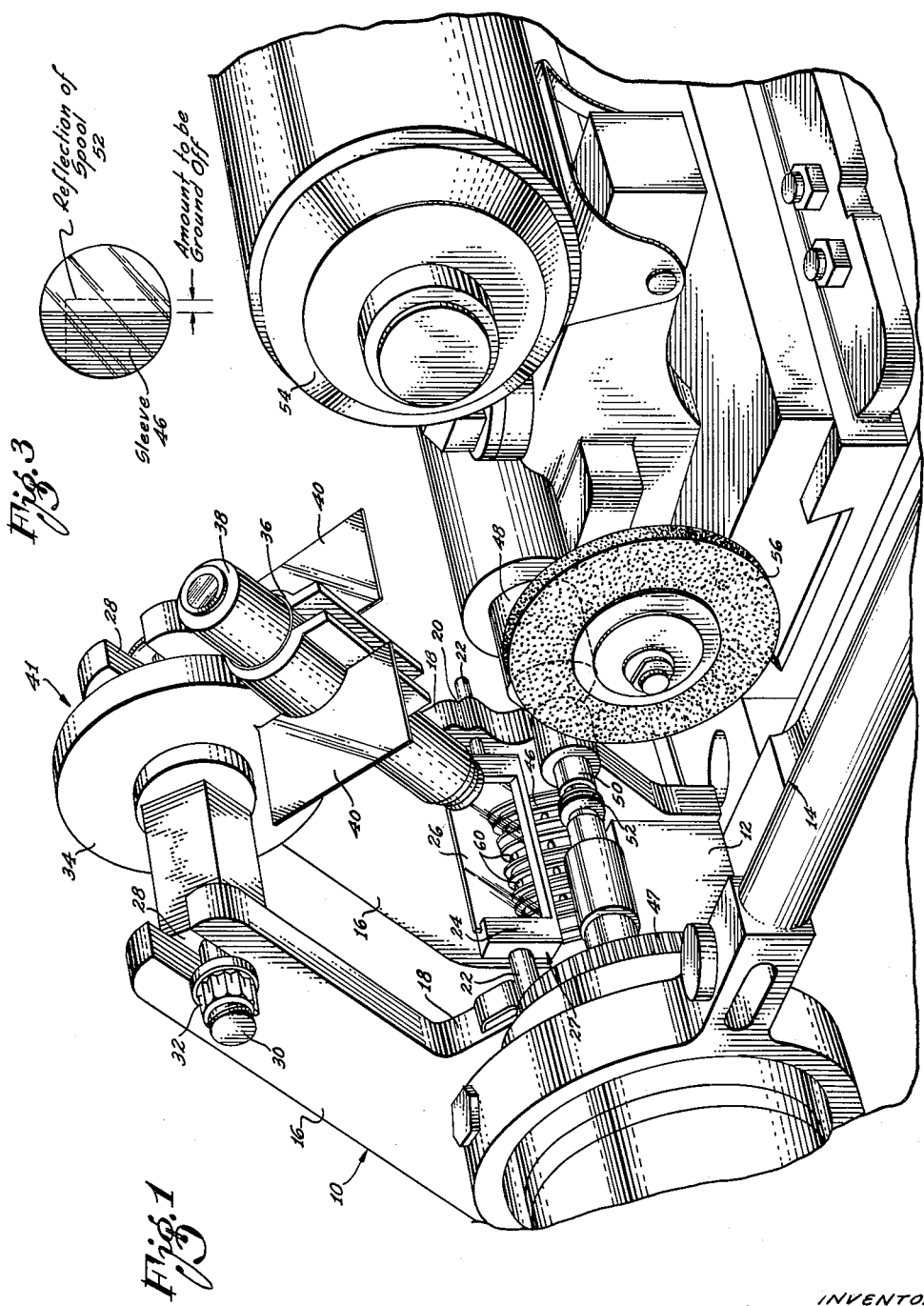
INVENTOR
Lee W. G. Beydler

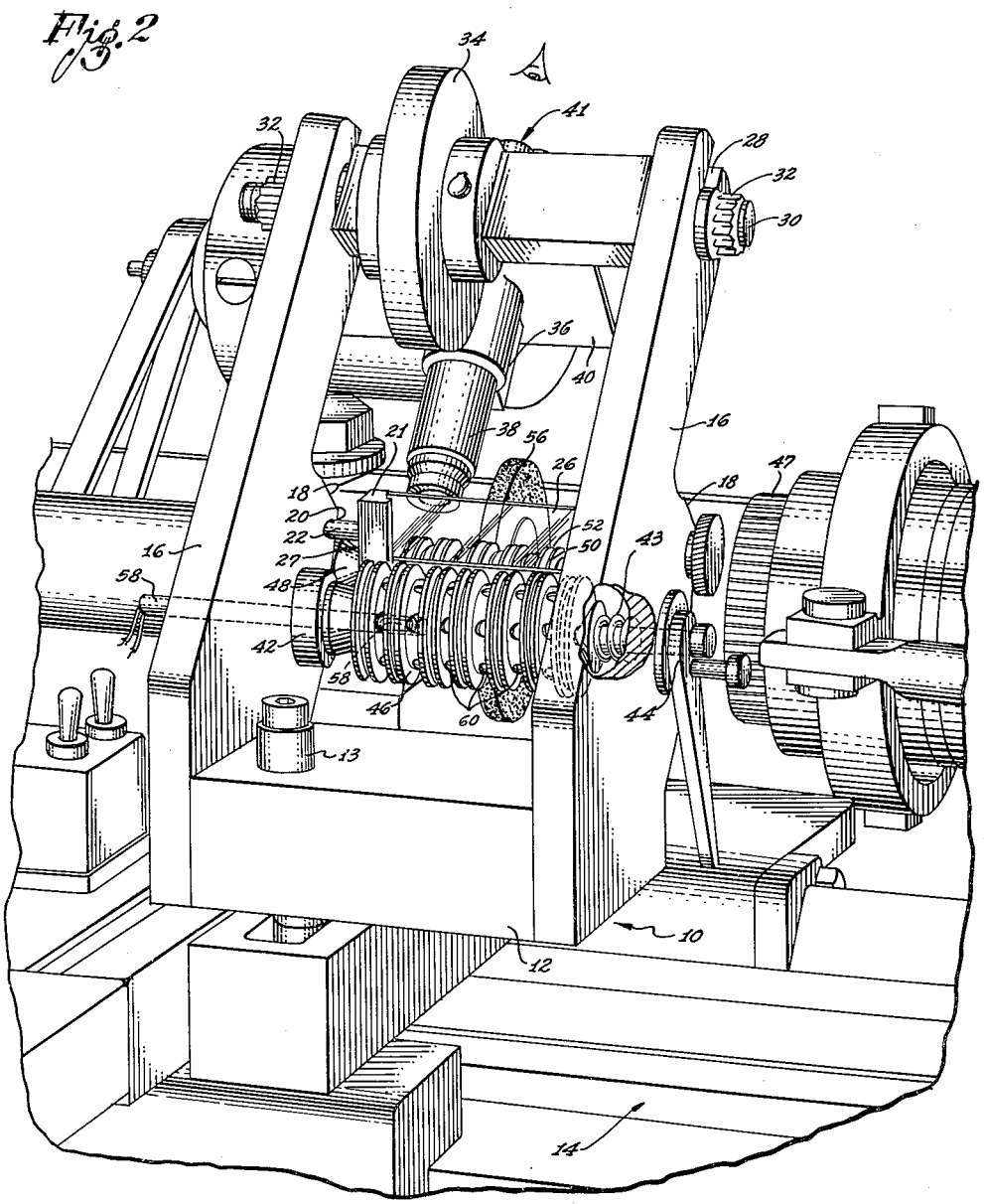

United States Patent Office 2,986,855
Patented June 6, 1961

2,986,855
PRECISION OPTICAL TOOLING
Lee W. G. Beydler, Torrance, Calif., assignor to Northrop Corporation, a corporation of California
Filed Aug. 12, 1958, Ser. No. 754,642
9 Claims. (Cl. 51—165)

This invention has to do with machine tools and tooling and more particularly with an optical tooling fixture to be removably attached to a machine power tool.

The increased interest and requirements relative to extremely close tolerance fabrication has resulted in creating a family of optical tools. It is now virtually mandatory that certain structures be made to very close tolerances. The optical tooling provides the end result that is required.

An example of close tolerance requirements are those having to do with pneumatic or hydraulic valves. In some cases it is necessary that the lands of the valve spool exactly coincide with the ports in the valve sleeve. In other words, if there is more than one land they should open and close the ports at exactly the same time. If they do not perform as desired then one port will open first and then another. The inverse is true as well. This unequal operation could and does have a great deal to do with efficient operation of an entire system.

It has been determined that very few valve sleeves and spools are identical. Therefore, it is necessary to machine either the spools or sleeves to obtain the tolerances required. The spool is more available and the lands are fully exposed once removed from the sleeve. This readily available structure is machined to mate or match with the ports of the sleeve.

An object of this invention is to provide a precision optical tool that will, in combination with a conventional power tool, machine valve spools and component structure to precise and exact tolerances.

Another object of this invention is to provide a precision optical tool that may be attached to a conventional power tool and the combination will provide precise and exact machining of valve spool structure and the like.

A yet further object of this invention is to provide a precision optical tool that will have placed in relationship thereto a reference structure and valve spool with the latter being machined to conditions that will enable the reference and spool to properly mate or match.

Briefly, the invention comprises a frame that is releasably attached or connected to the bed of a machine power tool. The sleeve of a pneumatic or hydraulic valve is supported in proper position by the frame. Along with the sleeve the frame supports a microscope, having a scalar graduation, and a beam splitter. The spool of the aforementioned valve is supported between rotating centers of the machine power tool. A grinder is provided to machine the lands of the spool. The lands, through the medium of the microscope and beam splitter, are properly aligned with the ports of the sleeve and excess material on the lands is removed by the grinder.

FIGURE 1 is a generally front fragmentary, perspective view of the device illustrating and having embodied therein the present invention.

FIGURE 2 is a generally rear, fragmentary, perspective view of the device illustrating and having embodied therein the present invention.

FIGURE 3 is a view of the valve sleeve and spool as viewed through the microscope.

Referring to the drawings for a more detailed description of the present invention 10 designates a generally U-shaped frame. The base 12 has a bolt 13 extending therethrough for the purpose of rigidly fastening the frame to the bed of a machine power tool 14. The sides or legs 16, of the frame, are irregular in shape as may be seen by referring to the two figures. Additionally, the sides are in parallel, spaced relationship.

Each leg 16 has a shoulder 18 in which there is a notch 20 to receive support pins 22. The pins support a frame 24 and located in the frame is an aluminized beam splitter 26. The beam splitter may have a 60 to 80 percent reflectivity. In other words, it is possible to see through the beam splitter 26 and at the same time it will function like a mirror. The beam splitter 26, frame 24, and supporting pins 22 will be referred to as the optical element broadly designated 27.

The uppermost free end of each leg or side 16 also has a notch 28 therein to receive a shaft 30. On each end of the shaft is a nut 32, or the like, that when properly positioned prevents longitudinal movement thereof. However, until the nuts 32 are positioned the shaft 30 may have lateral, longitudinal, and rotational movement.

Between the legs 16, the shaft 30 is square in order to receive a circular body 34. Integral with the body is a clamp 36 that holds a scalar microscope 38. Integral with the clamp 36 are a pair of spaced apart panels 40 that shield the eye of the viewer from the reflection of the beam splitter 26. The shaft 30, body 34, clamp 36, microscope 38, and panels 40 will hereinafter be referred to as the microscope assembly 41.

Between the base 12 and shoulder 18, of the legs 16, and on each of the latter are fixed non-rotatable centers 42 and 43 the latter being spring loaded. A lever mechanism 44 provides for proper adjustment of the spring loaded center. The other fixed center is hollow for reasons hereinafter to be explained.

As may be determined by referring to FIGURE 2, the ported sleeve 46 of the pneumatic or hydraulic valve is held firmly in position between the centers 42 and 43.

The machine power tool 14 illustrated is a conventional metal lathe that has a rotating chuck 47 and a center 48. The spool 50, having a number of lands 52 thereon, is clamped in the chuck 47 and further supported by the center 48.

A power grinder 54 is also mounted on the bed of the machine power tool 14. The grinder will have longitudinal and lateral movement in order that the grinding wheel 56 may be properly positioned with relationship to the lands 52 of the spool 50.

As previously stated fixed center 42 is hollow. This is for the purpose of receiving a light 58 that may be inserted into the sleeve 46.

The operation of the invention is as follows: The structure of this invention is positioned in the manner illustrated in Figures 1 and 2. The scalar microscope is positioned and adjusted in order that both the ported sleeve 46 and spool 50 may be seen at the same time with the structures appearing to be superimposed. This superimposed effect is obtained through the medium of the partially aluminized or silvered beam splitter 26. In other words, the sleeve is seen by light transmission through the beam splitter and the spool is seen by light reflection from the beam splitter. Since the beam splitter 26 is between the spool 50 and the sleeve 46 they appear to be superimposed.

The sleeve metering edges, which are defined by the ports 60, are aligned with land metering edges. However, one essential requirement is that the sleeve metering edges be visible at right angles to the axial center line. This requirement is accomplished by properly positioning the sleeve 46, spool 50, and microscope 38.

For instance, it may be desired that the spool lands be ground to zero overlap with respect to the sleeve ports 60. Therefore, the metering edge of one land is properly aligned with the metering edge of one port 60. Then the microscope is moved longitudinally to observe the other lands and ports. If there is an overlap of the metering edge of any other land, on the spool, with respect to the metering edge of the corresponding sleeve port 60 it will be seen in the superimposed form represented in FIGURE 3. Therefore, the degree of overlap may be readily determined by the microscope scale. That portion of land overlap may be ground away with the grinding wheel 56 of the power grinder 54. When the metering edge of one land is properly machined, the other metering lands may be treated in the same manner.

With this method of determining the difference between the metering edges of the ports 60 and the metering edges of the lands, any degree of overlap or underlap or zero lap of the lands may be provided.

Another important feature is that both essential parts, i.e. the sleeve 46 and the spool 50, are treated at the same temperature which eliminates temperature variation of length between the time a sleeve is measured and the spool lands are ground.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. Precision optical tooling comprising a frame releasably attached to a machine tool; fixed means on said frame for holding a valve sleeve; rotating centers on said machine tool for holding a valve spool; optical element between said sleeve and spool, and on said frame, for matching the lands of the spool with the ports of the sleeve; means on said machine tool for removing portions of the spool lands; and structure connected to said frame for measuring the amount of land to be removed.

2. Precision optical tooling comprising a frame releasably attached to a machine tool; fixed means on said frame for holding a valve sleeve; rotating centers on said machine tool for holding a valve spool; optical element between said sleeve and spool, and on said frame, for matching the lands of the spool with the ports of the sleeve; means on said machine tool for removing portions of the spool lands; and structure connected to said frame for measuring the amount of land to be removed; said fixed means being fixed centers.

3. Precision optical tooling comprising a frame releasably attached to a machine tool; fixed means on said frame for holding a valve sleeve; rotating centers on said machine tool for holding a valve spool; optical element between said sleeve and spool, and on said frame, for matching the lands of the spool with the ports of the sleeve; means on said machine tool for removing portions of the spool lands; and structure connected to said frame for measuring the amount of land to be removed; said optical element being a beam splitter.

4. Precision optical tooling comprising a frame releasably attached to a machine tool; fixed means on said frame for holding a valve sleeve; rotating centers on said machine tool for holding a valve spool; optical element between said sleeve and spool, and on said frame, for matching the lands of the spool with the ports of the sleeve; means on said machine tool for removing portions of the spool lands; and structure connected to said frame for measuring the amount of land to be removed; said means being a powered grinding wheel.

5. Precision optical tooling comprising a frame releasably attached to a machine tool; fixed means on said frame for holding a valve sleeve; rotating centers on said machine tool for holding a valve spool; optical element between said sleeve and spool, and on said frame, for matching the lands of the spool with the ports of the sleeve; means on said machine tool for removing portions of the spool lands; and structure connected to said frame for measuring the amount of land to be removed; said structure being a microscope having a scalar graduation.

6. Precision optical tooling comprising a frame releasably attached to a machine tool; fixed centers on said frame for holding a valve sleeve; rotating centers on said machine tool for holding a valve spool; optical element between said sleeve and spool, and on said frame, for matching the lands of the spool with the ports of the sleeve; means on said machine tool for removing portions of the spool lands; and structure connected to said frame for measuring the amount of land to be removed.

7. Precision optical tooling comprising a frame releasably attached to a machine tool; fixed centers on said frame for holding a valve sleeve; rotating centers on said machine tool for holding a valve spool; optical element between said sleeve and spool, and on said frame, for matching the lands of the spool with the ports of the sleeve; means on said machine tool for removing portions of the spool lands; and structure connected to said frame for measuring the amount of land to be removed; said optical element being a beam splitter.

8. Precision optical tooling comprising a frame releasably attached to a machine tool; fixed centers on said frame for holding a valve sleeve; rotating centers on said machine tool for holding a valve spool; optical element between said sleeve and spool, and on said frame, for matching the lands of the spool with the ports of the sleeve; means on said machine tool for removing portions of the spool lands; and structure connected to said frame for measuring the amount of land to be removed; said means being a powered grinding wheel.

9. Precision optical tooling comprising a frame releasably attached to a machine tool; fixed centers on said frame for holding a valve sleeve; rotating centers on said machine tool for holding a valve spool; optical element between said sleeve and spool, and on said frame, for matching tthe lands of the spool with the ports of the sleeve; means on said machine tool for removing portions of the spool lands; and structure connected to said frame for measuring the amount of land to be removed; said structure being a microscope having a scalar graduation.

References Cited in the file of this patent

UNITED STATES PATENTS

| | | |
|---|---|---|
| 2,184,750 | Meinhardt et al. | Dec. 26, 1939 |
| 2,745,222 | Charf et al. | May 15, 1956 |
| 2,775,158 | Mitchell | Dec. 25, 1956 |